United States Patent Office.

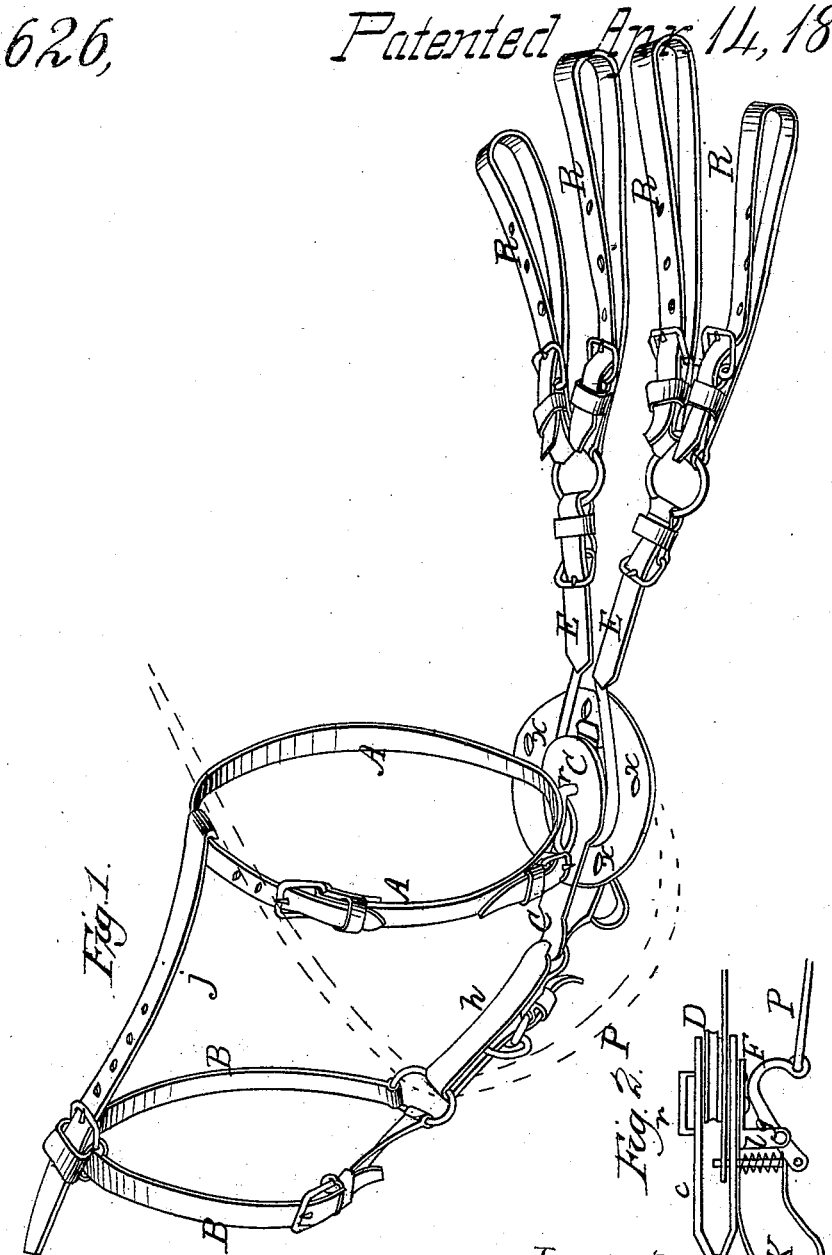

THEOPHILUS HAMMOND, OF PETERSBURG, INDIANA.

Letters Patent No. 76,626, dated April 14, 1868.

IMPROVEMENT IN HARNESS FOR BREAKING HORSES.

The Schedule referred to in these Letters Patent and making part of the same.

TO ALL WHOM IT MAY CONCERN:

Be it known that I, THEOPHILUS HAMMOND, of Petersburg, in the county of Pike, and in the State of Indiana, have invented certain new and useful Improvements in Harness for Breaking Vicious Horses; and do hereby declare that the following is a full, clear, and exact description thereof, reference being had to the accompanying drawings, and the letters of reference marked thereon.

In the annexed drawings, making a part of this specification, a represents a surcingle, which is made of suitable size and strength, or the saddle of a harness, as the case may be, and B represents a neck-strap, or the collar of the harness. The surcingle A and neck-strap B are connected together by suitable straps, $j$ and $h$, at the top and bottom, as is fully shown in the drawings.

C represents a metallic forked or double plate, in which is adjusted the pulley D. The double plate C is provided with a suitable loop or hole, through which the connecting-strap or martingale $h$ may pass, and with a loop, $r$, on its upper side, for the surcingle A to work in, and has a post, shoulder, or projection, $g$, secured on its under side. The pulley D is provided with a projecting flange, or is secured to the side of a wheel somewhat larger than it in diameter, said wheel being provided with a number of holes, $x$, through it, as shown in the drawings.

Around, and working on the pulley D, is a round cord or strap, E, so as to work freely thereon, which has a ring secured in or to each end thereof. In the rings at the ends of the strap E are buckled double straps, R R, one in each a little longer than the other. These straps R R are designed to be adjusted around the hind legs of a young or vicious animal, one above and the other below the hock of each hind leg. By regulating the length of the strap E, or the straps R R, to suit the size of the animal, by means of buckles or otherwise, it will be seen that said animal may walk or step forward or back, one foot at a time, without constraint, but that he is effectually prevented or held from kicking or throwing back both hind feet at the same time.

Pivoted in the projection $g$ is a crooked lever, F, made substantially in the form shown in the drawings, and which has a pin, embraced by spiral spring $l$, pivoted to one end thereof, and projecting upward into the lower side of the plate C.

The movable pin at the end of the lever F is designed to catch in one of the holes $x$, and thereby stop the rotary motion of the pulley D, whenever desired. Said pin is operated by means of a cord or strap, P, which is secured to the lever F, and then passes between the fore legs of the animal, and through a ring on the collar or neck-strap B, and thence to the rider or driver, as the case may be. When the strap P is loosened, the pin is forced out of the flange of the pulley by means of the spiral spring $l$, or steel spring K, or both, as may be required.

Having thus fully described my invention, what I claim as new, and desire to secure by Letters Patent, is—

The arrangement of the forked bar C, with its perforated disk, and pulley D, lever F, and spring, in combination with the straps E and R R and harness, as herein described, all constructed and operating substantially as set forth.

In testimony that I claim the foregoing, I have hereunto set my hand, this 30th day of January, 1868.

THEOPHILUS HAMMOND.

Witnesses:
HENRY M. SCOTT,
S. T. PALMER.